United States Patent [19]
Kusik

[11] Patent Number: 6,070,984
[45] Date of Patent: Jun. 6, 2000

[54] SPOT MIRROR ASSEMBLY

[75] Inventor: David J. Kusik, West Allis, Wis.

[73] Assignee: Velvac, Inc., New Berlin, Wis.

[21] Appl. No.: 09/083,843

[22] Filed: May 22, 1998

[51] Int. Cl.[7] .................................................. G02B 7/182
[52] U.S. Cl. .......................................... 359/872; 248/481
[58] Field of Search .................................... 359/872, 877;
248/477, 479, 481, 483

[56] References Cited

U.S. PATENT DOCUMENTS

| | | | |
|---|---|---|---|
| 1,863,060 | 6/1932 | Knutson | 248/481 |
| 2,457,639 | 12/1948 | Brooks | 248/481 |
| 2,929,600 | 3/1960 | Malachowski | 248/481 |
| 4,244,548 | 1/1981 | Sharp | 248/481 |
| 4,565,345 | 1/1986 | Templeman | 248/481 |
| 4,747,679 | 5/1988 | Beach, Jr. | 359/872 |
| 4,804,257 | 2/1989 | Schmidt et al. | 359/865 |
| 4,815,836 | 3/1989 | Byers et al. | 359/881 |
| 5,198,938 | 3/1993 | Ward | 359/864 |
| 5,260,835 | 11/1993 | Huang | 359/872 |
| 5,327,288 | 7/1994 | Wellington et al. | 359/872 |

OTHER PUBLICATIONS

Velvac Convex Mirror Head Assembly Drawing No. 7080920, Feb. 21, 1990.
Velvac Convex Mirror Head Assembly for K–10 Drawing No. 7092100, Jun. 12, 1996.

*Primary Examiner*—Cassandra Spyrou
*Assistant Examiner*—Euncha Cherry
*Attorney, Agent, or Firm*—Michael Best & Friedrich LLP

[57] ABSTRACT

The invention provides a mirror assembly adapted to be mounted on a mirror support. The mirror assembly includes a convex mirror glass and a rear plate having an exterior surface, an interior surface and an aperture, and a seal between the mirror glass and the rear plate. The mirror assembly also includes a pin including a head, a ribbed portion, and having a longitudinal axis. The mirror assembly further includes a ball joint comprising an inner ball portion and an outer ball portion. The inner ball portion includes a first bore extending therethrough and an engagement surface for contacting the interior surface of the rear plate. The first bore is aligned with said the aperture for allowing passage of the pin. The outer ball portion includes a concave engagement surface for contacting the exterior surface of the rear plate and a second bore extending axially through the outer ball portion. The second bore is aligned with the first bore for allowing passage of the pin. The ribbed portion of the pin is engaged in the second bore to provide a press fit. The press fit fixes the pin both rotationally and axially with respect to the outer ball portion. Further, the mirror assembly includes a nut that mates with the pin and secures the mirror assembly to the mirror support.

11 Claims, 1 Drawing Sheet

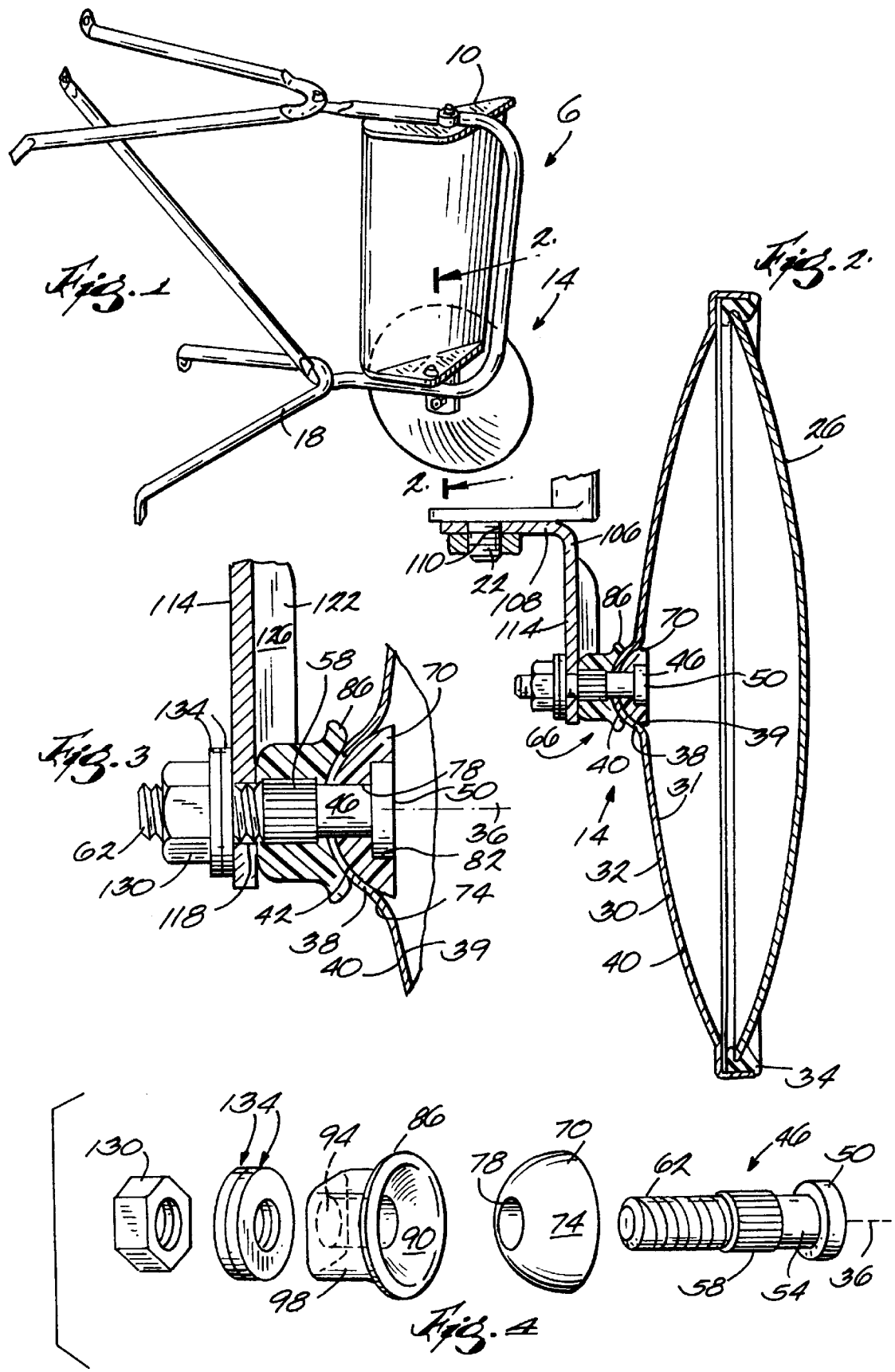

SPOT MIRROR ASSEMBLY

FIELD OF THE INVENTION

The invention relates generally to rear view mirrors, and more particularly to convex "spot" mirrors.

BACKGROUND OF THE INVENTION

Prior art spot mirror designs incorporated a variety of methods for securing and fixing the position of the mirror. Typically, two nuts were used in the prior spot mirror assemblies. One nut would serve to compress the components of the mirror assembly so the mirror could be secured in the desired pivotal position with respect to the vehicle. This nut also prevented the bolt from moving axially inward toward the center of the mirror. The second nut was then used to fasten the mirror assembly to the support mounted on the vehicle.

To prevent the mirror assembly from rotating about the axis of the bolt, some type of anti-rotation mechanism was needed. Typically, a tongue and groove formation was used between the rear plate of the mirror and the ball joint. This would prevent the mirror from spinning around the bolt causing the drain hole to rotate away from the bottom center position.

Another method utilized for preventing rotation of the mirror about the bolt was to make the counterbore hexagonal in shape in order to match the shape of the head of the bolt. By doing so, the inner portion of the joint with the counterbore would not be able to rotate relative to the axis of the bolt.

SUMMARY OF THE INVENTION

Large vehicles such as trucks and buses typically have side-mounted rear view mirror assemblies. Many of these assemblies include a convex "spot" mirror which is necessary to see the vehicle's blind spot. These common spot mirror assemblies suffer from a variety of disadvantages most of which relate to the difficulty in mounting, adjusting, or maintaining the positioning of the mirror.

Mounting most common spot mirror assemblies onto trucks or buses is a difficult task simply because the work must be performed overhead due to the height of the vehicle and the location of the rear view mirrors. The difficulty is compounded when the mounting requires the use of two wrenches to properly tighten the two nuts. Further problems occur when the bolt is free to rotate or move axially in and out from the back of the mirror. For example, it is common for a person mounting a spot mirror to have the bolt fall inside the mirror when the nut is removed. When this happens, the mirror is rendered useless unless it can be opened and the bolt replaced in the hole. Some common spot mirrors do not open, or if they do, the seal is damaged or destroyed in the process. Losing a bolt into the mirror also occurs during assembly of the spot mirrors, and causes similar waste.

Another disadvantage of common spot mirrors is that once they have been mounted, adjustment can be difficult because often two tools must be used concurrently. With one tool in each hand, the adjuster does not have a free hand with which to adjust and hold the mirror. This either means that a second person is needed to properly adjust the mirror, or the single adjuster has to use his arm or shoulder to hold the mirror in place, likely resulting in several unsuccessful attempts at the desired positioning.

Yet another disadvantage of common spot mirrors is that the assemblies are made of metals that corrode. For example, common mirror assemblies utilize steel for the components of the joint. Over time, the joint components begin to corrode causing the joint to "freeze", thereby making adjustment difficult.

The invention provides an improved spot mirror assembly which serves to remedy the disadvantages of common spot mirror assembly designs. In particular, the invention allows the user to mount or adjust the spot mirror using only one tool, leaving one hand free to hold and adjust the mirror. The invention also prevents the occurrence of the bolt falling inside the mirror. The use of nylon for the joint components makes the invention corrosion resistant and therefore easily manipulatable for years of use. Finally, the invention's design facilitates its manufacture and assembly.

More particularly, the invention provides a mirror assembly adapted to be mounted on a mirror support. The mirror assembly includes a convex mirror glass and a rear plate having an exterior surface, an interior surface and an aperture, and a seal between the mirror glass and the rear plate. The mirror assembly also includes a pin including a head, a ribbed portion, and having a longitudinal axis. The mirror assembly further includes a ball joint comprising an inner ball portion and an outer ball portion. The inner ball portion includes a first bore extending therethrough and an engagement surface for contacting the interior surface of the rear plate. The first bore is aligned with said the aperture for allowing passage of the pin. The outer ball portion includes a concave engagement surface for contacting the exterior surface of the rear plate and a second bore extending axially through the outer ball portion. The second bore is aligned with the first bore for allowing passage of the pin. The ribbed portion of the pin is engaged in the second bore to provide a press fit. The press fit fixes the pin both rotationally and axially with respect to the outer ball portion. Further, the mirror assembly includes a nut that mates with the pin and secures the mirror assembly to the mirror support.

DESCRIPTION OF THE DRAWINGS

FIG. 1 is a perspective view of a spot mirror assembly embodying the invention.

FIG. 2 is a cross sectional view taken along line 2—2 in FIG. 1.

FIG. 3 is an enlarged view of a portion of FIG. 2.

FIG. 4 is an exploded view of a portion of the spot mirror assembly shown in FIG. 1.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

The drawings (FIG. 1) illustrate a rear view mirror assembly 6 mounted to a vehicle (not shown) which includes a flat mirror 10, a spot mirror assembly 14, a bracket 18 supporting the flat mirror 10 and including a downwardly extending lug 22 upon which the spot mirror assembly 14 is fixed in a manner discussed below.

The spot mirror assembly 14 (FIGS. 2 and 3) includes a convex mirror glass 26 which is supported by a rear plate 30.

A gasket 34 lies between the periphery of the convex mirror glass 26 and the rear plate 30, and provides a substantially water tight seal between them. The rear plate 30 is a dish-shaped member which provides the backing to the convex mirror glass 26. The rear plate 30 has a substantially spherical curvature defining a concave plate surface 31 facing the convex mirror glass 26 and a convex plate surface 32 facing away from the convex mirror glass 26. The rear plate 30 includes a dimple 38 which is located on an axis 36 and which protrudes away from the convex mirror glass 26. The dimple 38 defines a concave interior surface 39 and a convex exterior surface 40. The rear plate 30 also includes an oversized central aperture 42 centered on the axis 36.

Also included in the spot mirror assembly 14 is a serrated pin 46. At one end, the serrated pin 46 includes a head 50 which, in the preferred embodiment, is circular and flat. At the other end, the serrated pin 46 has a threaded portion 62. A shank 54 extends axially from the head 50 and is substantially smooth. The diameter of the shank 54 is smaller than the diameter of the oversized central aperture 42 to allow for clearance during adjustment of the spot mirror assembly 14. Between the threaded portion 62 and the shank 54 there is a ribbed portion 58 which extends both axially and radially from the shank 54 to the threaded portion 62.

The spot mirror assembly 14 also includes a two-part ball joint 66 including an inner ball portion 70 and an outer ball portion 86, both made of a non-corrosive and non-metallic material (nylon is used in the preferred embodiment). The inner ball portion 70 is substantially hemi-spherical in shape and defines a convex engagement surface 74 which contacts the concave interior surface 39 of the dimple 38. The inner ball portion 70 includes a bore 78 extending along the axis 36, and a counterbore 82 extending coaxially with the bore 78. The counterbore 82 receives the head 50 of the serrated pin 46, and the bore 78 receives the shank 54.

The outer ball portion 86 defines a concave engagement surface 90 which provides substantially line contact, in the form of a circle, with the convex exterior surface 40 of the dimple 38. The outer ball portion 86 also includes a bore 94 which extends along the axis 36 and which aligns with both the oversized central aperture 42 of the rear plate 30 and the bore 78 of the inner ball portion 70. The bore 94 has a diameter which is smaller than the outer diameter of the ribbed portion 58 of the serrated pin. When the ribbed portion 58 of the serrated pin 46 is inserted into the bore 94, a tight "press fit" is created and rotation and axial movement of the serrated pin 46 relative to the outer ball portion 86 is prevented. The outer ball portion 86 further includes a head 98 (shown as square but which could be any suitable configuration) which is opposite of the concave engagement surface 90 and includes at least one planar surface. In the preferred embodiment, the head 98 defines opposed flats.

The spot mirror assembly 14 also includes an L-shaped support bracket 106 which includes a lug mount arm 108 and a mirror mount arm 114. The lug mount arm 108 has therein a hole 110 for receiving the downwardly extending lug 22 in order to fasten the L-shaped support bracket 106 to the bracket 18. In the preferred embodiment, the lug mount arm 108 is fastened in a horizontal orientation to the bracket 18 using a nut fastened underneath the lug mount arm 108 on the downwardly extending lug 22. The mirror mount arm 114 is then oriented vertically and has therein a slot 118 which receives the threaded portion 62 of the serrated pin 46. The slot 118 allows for vertical adjustment of the spot mirror assembly 14 relative to the bracket 18 which is fixed to the vehicle. The mirror mount arm 114 also includes flanges 122 which extend vertically along the edges of the mirror mount arm 114. Each flange 122 provides respective inner flange surfaces 126 that engage the opposed flats on the head 98 of the outer ball portion 86 and prevent rotation of the outer ball portion 86, and thus the rest of the spot mirror assembly 14, with respect to the L-shaped support bracket 106.

The spot mirror assembly 14 also includes a nut 130 and washers 134 which receive the threaded portion 62 of the serrated pin 46 and secure the spot mirror assembly 14 in place.

Advantageously, the spot mirror assembly 14 is designed such that the serrated pin 46 cannot move axially and fall through the oversized central aperture 42 into the area between the rear plate 30 and the convex mirror glass 26 during mounting or adjustment. This is accomplished through the incorporation of the ribbed portion 58 of the serrated pin 46 which creates a "press fit" when introduced into the bore 94 of the outer ball portion 86 of the ball joint 66. In addition to preventing axial movement of the serrated pin 46 relative to the outer ball portion 86, the rear plate 30 and the inner ball portion 70, the ribbed portion 58 also prevents rotation of the serrated pin 46 about axis 36 relative to the outer ball portion 86, the rear plate 30 and the inner ball portion 70. This means that the head 50 of the serrated pin 46 and the inner ball portion 70 need not be engaged to act as an anti-rotation mechanism. Therefore, the head 50 can simply be round (as opposed to hexagonal or square) and the counter bore 82 in the inner ball portion 70 can be circular, making it easy and inexpensive to manufacture. Further, assembly is facilitated by the disclosed arrangement in that no particular orientation of the serrated pin 46 is required during insertion of the serrated pin 46 into the inner ball portion 70 and through the outer ball portion 86. Another advantage of the spot mirror assembly 14 is that the flanges 122 on the L-shaped support bracket 106 prevent the rotation of the spot mirror assembly 14 about the axis 36, relative to the fixed bracket 18 mounted on the vehicle. This is accomplished by the engagement of the inner flange surfaces 126 with the opposed flats on the head 98 of the outer ball portion 86 as mentioned above. Further advantageously, the spot mirror assembly 14 only requires a single nut 130 to compress the washers 134, the L-shaped support bracket 106, the outer ball portion 86, the rear plate 30 and the inner ball portion 70. This means the spot mirror assembly 14 can be mounted and adjusted using only one wrench.

Yet another advantage is that both the inner ball portion 70 and the outer ball portion 86 are made of nylon (or any other non-corrosive and non-metallic material) which prevents corrosion and possible "freezing" at the concave engagement surface 90 which contacts the convex exterior surface 40 of the dimple 38 on the rear plate 30. This is true also for the convex engagement surface 74 which contacts the concave interior surface 39 of the dimple 38.

To adjust the spot mirror assembly 14, the user must simply loosen the single nut 130 while holding onto the rear plate 30. This will relax the compression in the spot mirror assembly 14 which enables the user to pivot the rear plate 30, and therefore the convex mirror glass 26, with respect to the outer ball portion 86. Since the diameter of the oversized central aperture 42 is larger than the diameter of the shank 54 of the serrated pin 46, the rear plate 30 can be pivoted through a wide range of motion with respect to the axis 36 to achieve the correct positioning required by the driver. Loosening the nut 130 also allows the user to adjust the vertical position of the spot mirror assembly 14 with respect to the bracket 18 fixed to the vehicle. With the nut 130 loosened, the user can slide the spot mirror assembly up or down by moving the serrated pin 46 up or down in the slot 118 in the mirror mount arm 114 of the L-shaped bracket 106. When satisfied with the vertical and pivotal positioning of the spot mirror assembly 14, the user simply tightens the nut 130 to achieve adequate compression for securing the position of the spot mirror assembly 14.

Various features and advantages of the invention are set forth in the following claims.

What is claimed is:

1. A mirror assembly adapted to be mounted on a mirror support, said mirror assembly comprising:
   a convex mirror glass;
   a rear plate having an exterior surface, an interior surface and an aperture;
   a seal between said mirror glass and said rear plate;
   a pin including a head and a ribbed portion and having a longitudinal axis;
   a ball joint comprising an inner ball portion and an outer ball portion, said inner ball portion including a first bore extending therethrough and an engagement surface for contacting said interior surface of said rear plate, said first bore being aligned with said aperture for allowing passage of said pin, said outer ball portion including a concave engagement surface for contacting said exterior surface of said rear plate and a second bore extending axially through said outer ball portion, said second bore being aligned with said first bore for allowing passage of said pin, said ribbed portion of said pin being engaged in said second bore to provide a press fit, said press fit fixing said pin both rotationally and axially with respect to said outer ball portion; and
   a nut that mates with said pin and secures the mirror assembly to the mirror support.

2. The mirror assembly of claim 1 wherein said ball joint is constructed of non-metallic material.

3. The mirror assembly of claim 1 wherein said ball joint is constructed of nylon.

4. The mirror assembly of claim 1 wherein said outer ball portion includes an outer ball head, said outer ball head defining at least one planar surface, and wherein the mirror assembly further comprises a mount arm attached to the mirror support, said mount arm including a flange with an inner surface that engages said planar surface to prevent rotational movement of said outer ball portion with respect to said mount arm.

5. The mirror assembly of claim 4 wherein said mount arm includes a slot formed therein, said pin extends through said slot, and said nut mates with said pin to secure said mirror assembly to said mount arm.

6. The mirror assembly of claim 5 wherein said ball joint is mounted a selected distance from the mirror support, and wherein said pin is movable in said slot to adjust the distance between said ball joint and the mirror support.

7. The mirror assembly of claim 1 wherein said pin further includes a circular head portion, and said inner ball portion further includes a circular counterbore extending coaxially with said first bore for receiving said circular head portion.

8. A mirror assembly adapted to be mounted on a mirror support, said mirror assembly comprising:
   a convex mirror glass;
   a rear plate having an exterior surface, an interior surface and an aperture;
   a seal between said mirror glass and said rear plate;
   a pin including a head and a ribbed portion and having an axis;
   a ball joint comprising an inner ball portion and an outer ball portion, said inner ball portion including a first bore extending therethrough and an engagement surface for contacting said interior surface of said rear plate, said outer ball portion including a concave engagement surface for contacting said exterior surface of said rear plate, a head including at least one planar surface, and a second bore extending axially through said outer ball portion, said first bore and said second bore being aligned with said aperture for allowing passage of said pin wherein engagement of said ribbed portion of said pin in said second bore provides a press fit, fixing said pin both rotationally and axially with respect to said outer ball portion;
   a mount arm attached to the mirror support, said mount arm having a slot formed therein and including a flange with an inner surface that engages said planar surface to prevent rotational movement of said outer ball portion with respect to said mount arm; and
   a nut that mates with said pin and secures the mirror assembly to said mount arm.

9. The mirror assembly of claim 8 wherein said ball joint is mounted a selected distance from the mirror support, and wherein said pin is movable in said slot to adjust the distance between said pin and the mirror support.

10. The mirror assembly of claim 8 wherein said pin further includes a circular head portion, and said inner ball portion further includes a circular counterbore extending coaxially with said first bore for receiving said circular head portion.

11. A mirror assembly adapted to be mounted on a mirror support, said mirror assembly comprising:
    a convex mirror glass;
    a rear plate including a dimple centered on said rear plate, said dimple including a concave interior surface, a convex exterior surface, and an aperture centered on said dimple;
    a gasket providing a substantially water tight seal between said mirror glass and said rear plate;
    a serrated pin including a pin head, a ribbed portion, and a threaded portion;
    a two-part ball joint made of non-corrosive and non-metallic material and including an inner ball portion and an outer ball portion, said inner ball portion including a convex engagement surface for contacting said concave interior surface of said dimple, a first bore extending through said inner ball portion for allowing passage of said threaded portion and said ribbed portion of said serrated pin, and a counterbore extending coaxially with said first bore in said inner ball portion for accepting said pin head, said outer ball portion including a concave engagement surface, a head defining opposed flats, and a second bore extending axially through said outer ball portion for allowing passage of said threaded portion of said serrated pin and for allowing engagement with said ribbed portion of said serrated pin to provide a press fit so that said serrated pin is both rotationally and axially fixed with respect to said outer ball portion;
    a mirror mount arm attached to the mirror support and including a slot, and flanges with inner flange surfaces that engage said opposed flats of said head of said outer ball portion thereby making said outer ball portion rotationally fixed with respect to said mount arm; and
    a nut that accepts said threads of said serrated pin and secures the mirror assembly to the mirror mount arm.

* * * * *